(No Model.)

A. D. SCHLESINGER.
PROCESS OF SECURING RIGID SOCKETS IN RUBBER PIPES.

No. 400,955. Patented Apr. 9, 1889.

WITNESSES:
Gustave Dieterich
T. F. Bourne.

INVENTOR
Augustus D. Schlesinger
BY-
Briesen & Steele
ATTORNEYS.

UNITED STATES PATENT OFFICE.

AUGUSTUS D. SCHLESINGER, OF COLLEGE POINT, ASSIGNOR TO THE INDIA RUBBER COMB COMPANY, OF NEW YORK, N. Y.

PROCESS OF SECURING RIGID SOCKETS IN RUBBER PIPES.

SPECIFICATION forming part of Letters Patent No. 400,955, dated April 9, 1889.

Application filed January 31, 1888. Serial No. 262,518. (No model.)

*To all whom it may concern:*

Be it known that I, AUGUSTUS D. SCHLESINGER, a resident of College Point, Queens county, New York, have invented an Improved Process of Securing Rigid Sockets in Rubber Pipes, of which the following is a specification.

The object of my invention is to secure rigid sockets within rubber pipes, so that they cannot again be withdrawn.

The invention consists in inserting a hard-rubber socket in an unvulcanized pipe or neck, and under a flange or cover of said unvulcanized rubber, and in then vulcanizing the soft rubber and forming it into a holder or washer for the socket, as will be more fully hereinafter set forth.

Reference is to be had to the accompanying drawings, forming part of this specification, in which—

Figure 1:
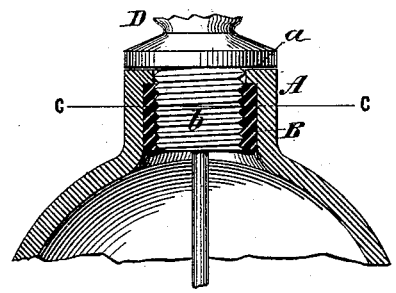
Figure 2:
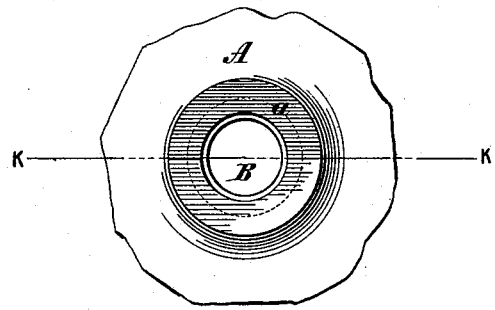
Figure 3:
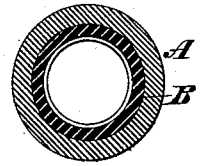

Figure 1 is a vertical cross-section on the line $k\,k$, Fig. 2, of a neck or pipe having a flange and containing a socket under the flange, constructed according to my process. Fig. 2 is a top view of the neck containing the socket; and Fig. 3 is a horizontal section on the line $c\,c$, Fig. 1.

My improved process is applicable to securing hard-rubber sockets in rubber pipes and necks for different purposes, and especially for securing a socket in the neck of a liquid-reservoir of an atomizer or sprayer for which I have made application for a patent, Serial No. 262,568, filed January 31, 1888.

In the accompanying drawings, the letter A represents a neck or pipe having an annular inwardly-projecting flange, $a$. B represents a socket made of hard rubber and contained within the neck A under the flange $a$. The socket B, preferably, has internal screw-threads, $b$, that are adapted to receive the threaded extension $d$ of a nozzle, D.

The above parts are similar to those shown in my aforementioned application.

In carrying out my invention I insert the hard-rubber socket B within the neck A, which is of unvulcanized rubber, so that the flange $a$ will be over the end of the hard-rubber socket B, as shown. I then vulcanize the unvulcanized rubber neck or pipe A while the socket is contained therein. The hard-rubber socket B and the neck or pipe A unite by such vulcanization into a substantially homogeneous mass and become inseparable. The socket is thus securely and permanently united with the neck A, and the flange $a$ is also secured to the end of the socket and constitutes a washer to the nozzle D.

By this improved process a very effective connection is made between the parts, and when a nozzle is screwed into the socket there will be no liability of the socket being pulled out of its pipe or neck A. This junction is also air-tight, which is necessary in many cases.

The neck or pipe A may be entirely closed at the end before being vulcanized, and the hole for finally developing the flange $a$ may be cut through the same after vulcanization.

Having now described my invention, what I claim is—

The process of securing sockets in necks and pipes herein described, which process consists in inserting a hard-rubber socket, B, in an unvulcanized neck or pipe, A, having a flange, $a$, and in then, by one operation, vulcanizing the unvulcanized rubber around and on top of the socket, thereby intimately uniting them, and forming said rubber neck or pipe into a holder and washer for the socket, substantially as specified.

AUGUSTUS D. SCHLESINGER.

Witnesses:
 AUG. ACHILIS,
 HARRY M. TURK.